(12) United States Patent
Olson

(10) Patent No.: US 11,414,193 B2
(45) Date of Patent: Aug. 16, 2022

(54) TRAY TABLE FOLDING MOUNT

(71) Applicant: Steven Olson, Bellevue, WA (US)

(72) Inventor: Steven Olson, Bellevue, WA (US)

( * ) Notice: Subject to any disclaimer, the term of this patent is extended or adjusted under 35 U.S.C. 154(b) by 0 days.

(21) Appl. No.: 16/724,996

(22) Filed: Dec. 23, 2019

(65) Prior Publication Data

US 2020/0198786 A1 Jun. 25, 2020

Related U.S. Application Data

(60) Provisional application No. 62/783,396, filed on Dec. 21, 2018.

(51) Int. Cl.
| | | |
|---|---|---|
| *B64D 11/00* | (2006.01) | |
| *B64D 11/06* | (2006.01) | |
| *B60N 2/809* | (2018.01) | |
| *B60N 2/838* | (2018.01) | |

(52) U.S. Cl.
CPC ........ *B64D 11/00152* (2014.12); *B60N 2/809* (2018.02); *B60N 2/838* (2018.02); *B64D 11/0638* (2014.12); *B64D 11/0642* (2014.12)

(58) Field of Classification Search
CPC .......... B64D 11/00152; B64D 11/0642; B64D 11/0638; B60N 2/882; B60N 2/879; B60N 2/874; B60N 2/806; A47C 7/383; A47C 7/622
See application file for complete search history.

(56) References Cited

U.S. PATENT DOCUMENTS

| | | | | |
|---|---|---|---|---|
| 9,150,130 | B2 * | 10/2015 | Jackow | A47C 16/00 |
| 9,791,098 | B2 * | 10/2017 | Boyer | B64D 11/0638 |
| 10,022,002 | B2 * | 7/2018 | Chen | A47B 23/043 |
| 10,226,130 | B2 * | 3/2019 | Hill | B60N 2/882 |
| 2014/0311388 | A1 * | 10/2014 | Korpi | B64D 11/00152 108/6 |
| 2016/0257404 | A1 * | 9/2016 | Ferris | F16M 11/10 |

* cited by examiner

*Primary Examiner* — Milton Nelson, Jr.
(74) *Attorney, Agent, or Firm* — Dean A. Craine, P.S.

(57) ABSTRACT

A tray table folding mount for use on an unfolded tray table on an aircraft that incorporates a headrest attached to an upper support attached to an intermediate member. The intermediate member is attached to a lower planar member that is placed over the tray table. The headrest includes a nose relief aperture that receives the nose of the passenger when his forehead and face are resting in the headrest. The upper support, the intermediate member, and lower planar member are easily assembled or disassembled and stored in a compact configuration. In one embodiment, the upper support and intermediate member are pivotally connected, and the intermediate member is pivotally connected to the lower planar support. Formed on the planar member is an edge engaging lip that captures an edge on the tray table. Also mounted on the intermediate member is a ledge configured to hold a viewing device.

15 Claims, 12 Drawing Sheets

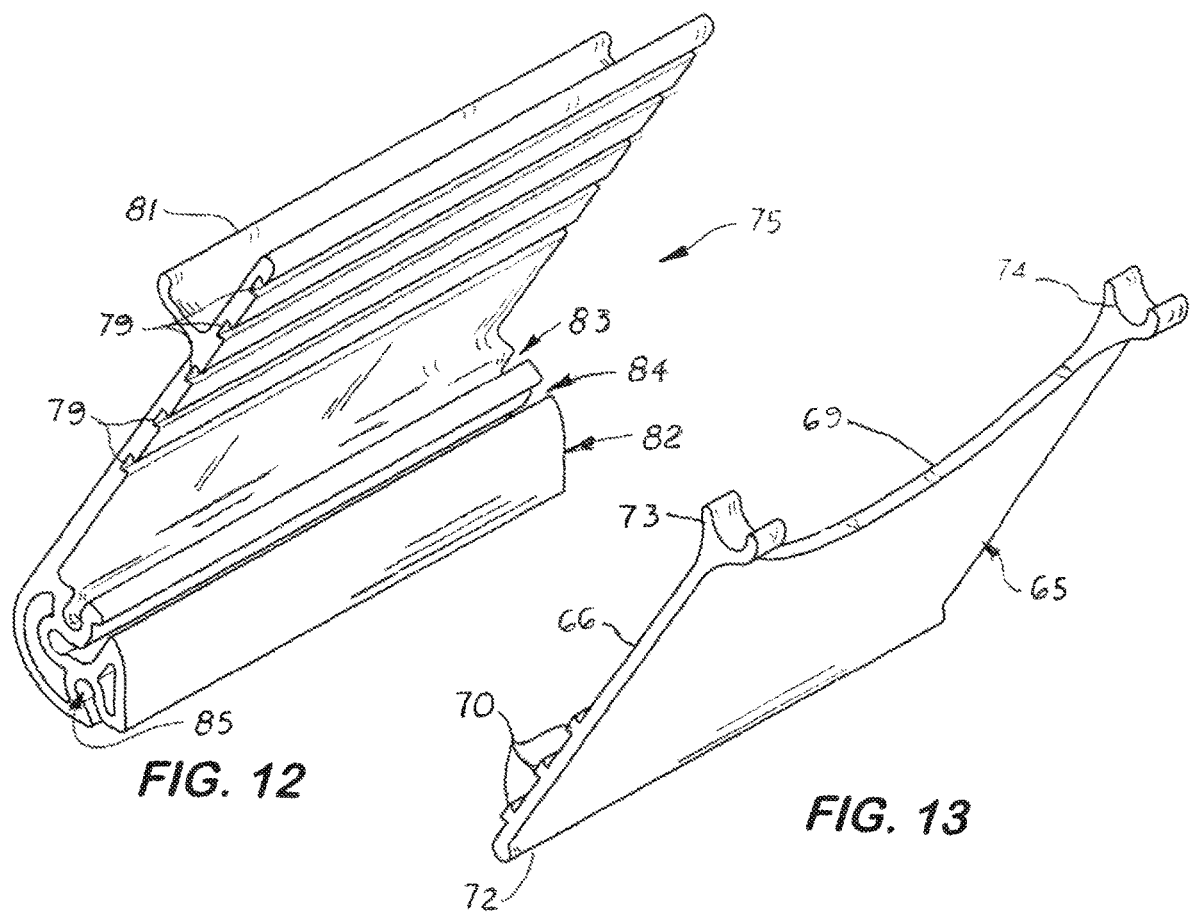
FIG. 12
FIG. 13
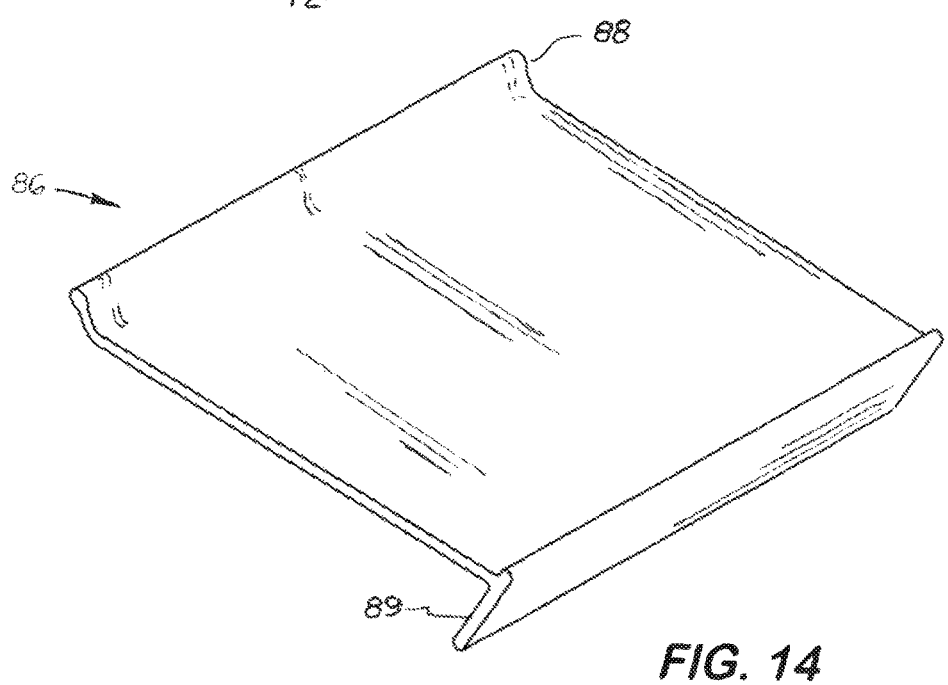
FIG. 14

TRAY TABLE FOLDING MOUNT

This utility patent application is based on and claims the filing date benefit of U.S. provisional patent application 62/783,396, filed on Dec. 21, 2018.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

A folding mount for an aircraft seat folding tray table that is temporarily set up on the tray table to support a passenger's head when leaning forward in the passenger seat or to support a viewing device on the tray table when sitting back in the passenger seat.

2. Description of the Related Art

Unless using the restroom, passengers in a passenger aircraft must stay in their assigned seats during a flight. Recently, airline companies have reduced the front to back spacing between seats in coach sections to provide more seats for passengers. Unfortunately, reducing the front to back spacing between the seats also reduces leg space. Because leg spacing is reduced, passengers in the front seats are prevented from reclining the seat back as far as they once use to. As a result, passengers in the coach sections are forced to sit upright or at a steep angle the entire flight.

Most passengers find sitting upright or at a steep angle the entire flight uncomfortable. To alleviate back and neck fatigue, some passengers will lower the tray table on the seat in front of them and lean forward and rest their arms on the tray table and lay their head on their arms. Unfortunately, passengers who try to rest their head on the tray table find it to be uncomfortable after a few minutes.

Many passengers also like to watch movies during the flight using their viewing device, such as a laptop, a smart phone or tablet computer. Often, they lower the tray table attached to the front seat and place the viewing device on the tray table and lean it against the back of the front seat for optimal viewing. Unfortunately, if the tray table is bumped or when air turbulence occurs, the viewing device falls over or falls from the tray table. For these reasons, most passengers resort to manually holding their viewing devices the entire flight.

Most airlines are now charging passengers for checked baggage. In response, more passengers are using carry-on luggage. The objects carried in carry-on luggage that is intended to be removed from the carry-on luggage and used on the flight must be capable of being folded into a compact storage configuration and then easily reassembled by the passenger while sitting in the seat.

What is needed is a tray table folding mount that is portable, capable of being folded into a compact configuration for storage in carry-on baggage and can be easily setup on an unfold table tray and used to support a passenger's head in an elevated position over the tray table when leaning forward in the seat and can also holds a viewing device in a hands-free manner above the tray table at an optimal viewing angle by the passenger supporting his head over the tray table or when sitting in the passenger seat.

SUMMARY OF THE INVENTION

It is an object of the invention to provide a portable, folding tray table mount used to support the head of a passenger (also called a user) when leaning forward in a passenger seat on an aircraft. Another object of the invention to provide such a tray table mount that can be stored in compact configuration in carry-on luggage and can be easily assembled by the passenger without tools while sitting in the passenger seat. It is a further object of the invention to provide a device that can hold a viewing device while using the mount to support the head and also securely holds the viewing device at an angle that is at an optimal viewing angle when the passenger is sitting back in the passenger seat.

Disclosed herein are three embodiments of the tray table mount each designed to be selectively placed over an unfolded tray table attached to the back of an aircraft passenger seat. Each embodiment includes an elevated headrest configured to support the head of a passenger leaning forward in a passenger seat and over an unfolded tray table. In one embodiment, the headrest is mounted on an upper support that pivots in fore and aft directions over a rigid intermediate member. In two embodiments, the headrest swivels in a fore and aft direction over the upper support.

The mount also includes an intermediate support that is integrally formed or attached to a planar, lower planar base configured to rest over the top surface of the unfolded tray table. The lower planar base includes a tray table edge engaging member configured to capture either the front edge or the rear edge of the tray table that impedes movement of the lower planar base over the tray table.

In one embodiment, the intermediate support is curved with an upper end pivotally attached to the lower end of the upper support and a lower end pivotally attached to the lower planar base. The two hinges enabling enable the user to angularly adjust the position of the upper support relative to the intermediate member. Angular adjustment of the upper support enables the user to adjust the height and the fore and aft locations of the headrest relative to the tray table to accommodate different users. Angular adjustment of the upper support over the intermediate member also allows the upper support and the intermediate member to be folded into a compact configuration and/or disassembled for compact storage.

In another embodiment, the upper support and the intermediate member are rigid straight structures configured to be longitudinally aligned and selectively locked together at different locations to adjust the overall length of the joined structure. By adjusting the overall length of the joined structure, the distance between the headrest and the tray table and the distance the headrest extends towards the user may be adjusted.

In a third embodiment, the intermediate member and the upper support are pivotally connected that enables the user to adjust the angle of the upper support relative to the intermediate member. In the third embodiment, a hinge is also disposed between the intermediate member and the lower planar base member enabling the user to adjust their relative positions as well.

All embodiments include a transversely aligned ledge that is attached or formed on the front surface of the upper support or to the intermediate member configured to hold a viewing device when facing the user.

Also, in all three embodiments, the intermediate member extends diagonally upward from the edge of the lower planar base opposite the edge engaging member. The upper support is longitudinally aligned and selectively attaches to the intermediate member and extends over the tray table so that the weight of the user's head is aligned over the tray table. Because the headrest may swivel in fore to aft directions, the user head remains axially aligned over the tray table at all times.

Further, in all three embodiments, the lower planar base may be rotated 180 degrees over the tray table so that the edge engaging member captures either the front edge or the rear edge of the tray table. When rotated to capture the front edge of the tray table, the ledge attached to the intermediate member extends rearward and towards the user. A viewing device may then be placed on the ledge positioning the view device at an elevated position over the tray table.

In every embodiment, the components are designed to disconnect or adjust their relative positions to place the mount in a compact storage configuration for carrying it in backpack or carry-on luggage.

During use, the user lowers the tray table and assembles the mount for use on the tray table. After assembly, the user then determines if he or she wants to use the mount as a headrest or as a viewing device. If the user wants to use the mount as a headrest, the user places the lower planar base on the tray table so that the edge engaging member extends over the exposed edge of the tray table. The user then adjusts the intermediate member and the upper support so the user may comfortably rest his or her head at a desired location over the tray table. The user may place a viewing device over the top surface of lower planar base and accommodate the user's nose.

If the user wants to use the mount as a viewing device when sitting back in the passenger seat, the user places the lower planar base on the tray table so that the edge engaging member extends over the front edge of tray table adjacent to the front seat. The user then adjust the intermediate member to place the ledge at the desired angle to hold the viewing device for optimal viewing.

DESCRIPTION OF THE DRAWINGS

FIG. 12 is a front perspective view of the upper support member.

FIG. 13 is a front perspective view of the intermediate member.

FIG. 14 is a front perspective view lower planar base.

DESCRIPTION OF THE PREFERRED EMBODIMENT(S)

Figure 1:
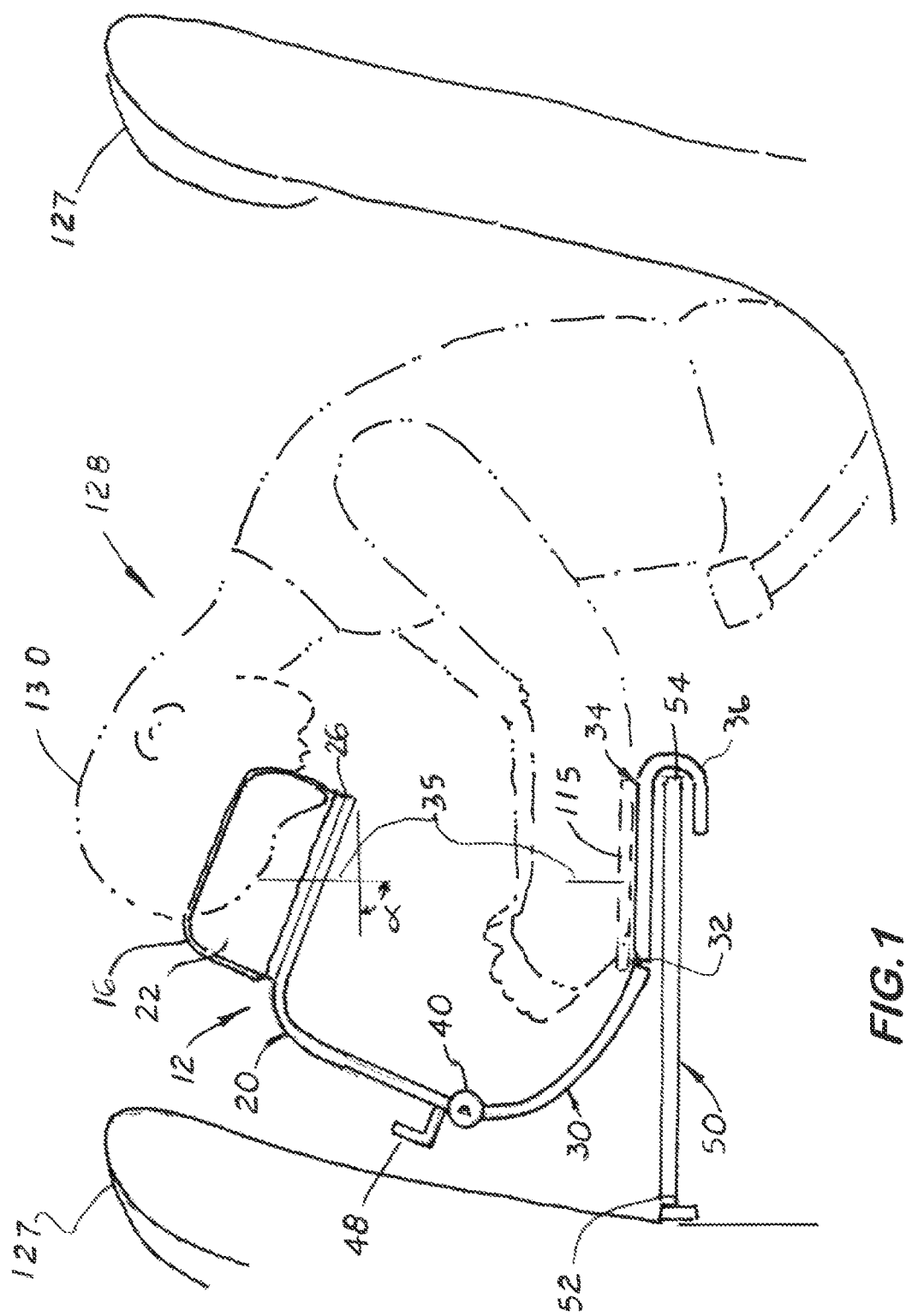
FIG. 1 is an illustration showing a first embodiment of a tray table folding mount positioned on an unfolded tray table attached to the back of a passenger seat with the edge engaging member capturing the rear edge of the tray table and showing a user sitting in the passenger seat and leaning forward and resting his or her head on the headrest support and resting his or her arms on the lower planar base.

Disclosed herein are three embodiments of a tray table folding mount 10, 60 and 90 shown in FIGS. 1-6, 7-16, and 17-20 respectively. The folding mount 10, 60 and 90 are designed to be lightweight, portable in carry-on luggage and can be easily assembled by the passenger 94 while seated in an aircraft seat 127. In both embodiments, the folding mounts 10, 60 includes an elevated U-shaped headrest 12 configured to support a downward facing head 95 of a passenger 94 leaning forward in a passenger seat 127. The folding mounts 10, 60 and 90 are designed to be used in two orientations—a rearward orientation used to support the head leaning over the tray table 50 and a forward orientation used to support a viewing device 125 at an elevated position over the tray table 50.

In the first embodiment the folding mount 10 includes a headrest 12 integrally formed or attached to a curved upper support 20 attached or formed on the upper end of a curved intermediate member 30. The curved intermediate member 30 is integrally formed or pivotally attached via hinge 32 to a lower planar base 34 configured rest over the top surface of the tray table 50. The flat lower planar base 34 includes an edge engaging member 36 configured to capture either the front edge 52 or the rear edge 54 of the tray table 50.

As shown more clearly in FIG. 1, the curved intermediate member 30 bends rearward and upward from the lower planar base 34. The curved upper support 20 extends upward and bends rearward from the intermediate member 30 so the headrest 12 extends diagonally downward and aligned over the center axis 35 of the lower planar base 34.

The headrest 12 includes a center plate 13 with two vertical side ears 14, 15. The center plate 13 is diagonally aligned with the upper support 20 and is configured to support the user's head 95 when the user leans his or her head 140 forward. In one embodiment, the center plate 13 is covered by a complimentary shaped cushion 16 that includes a nose relief aperture 18 that receives the nose of the user when his forehead and face are resting in the cushion 16.

Figure 3:
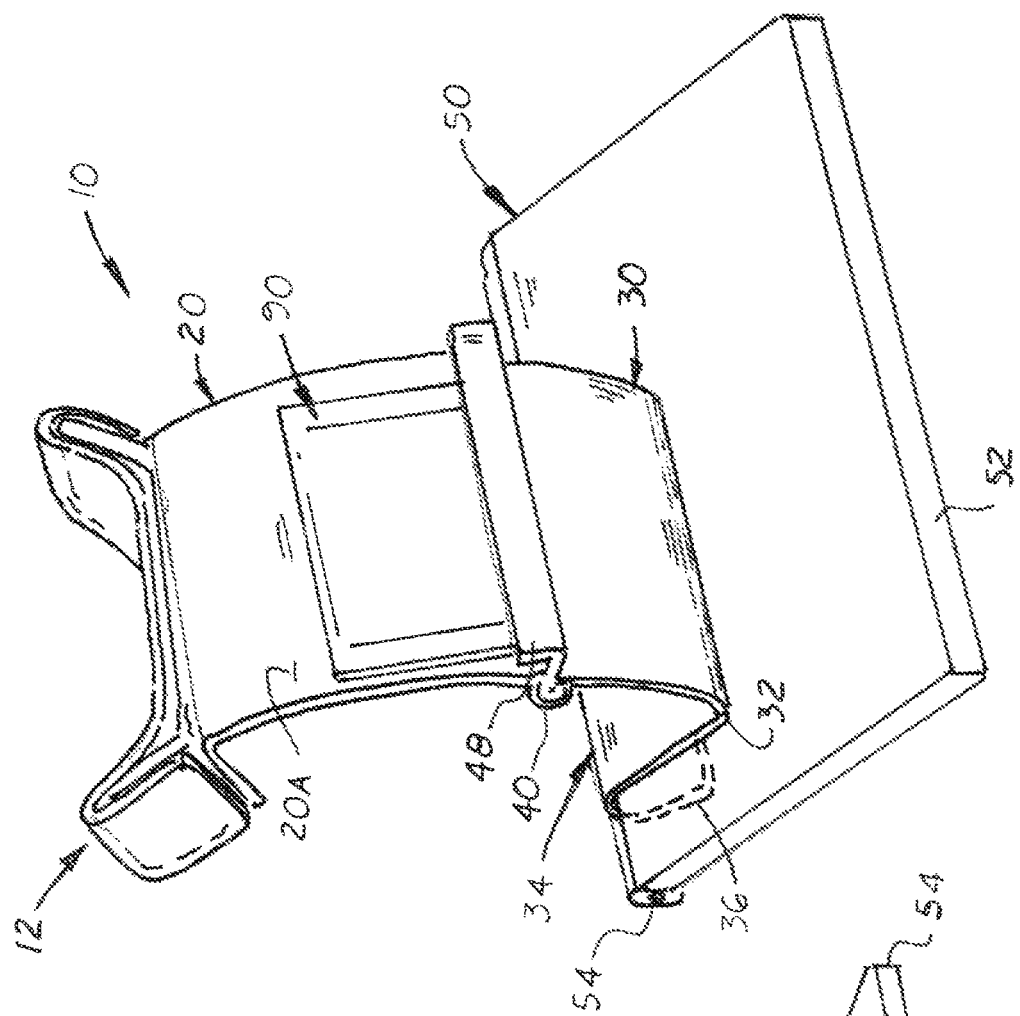
FIG. 3 is a front left side perspective view of the headrest support oriented so the edge engaging member captures the front edge of the tray table and showing a viewing device placed in the ledge.
Figure 2:
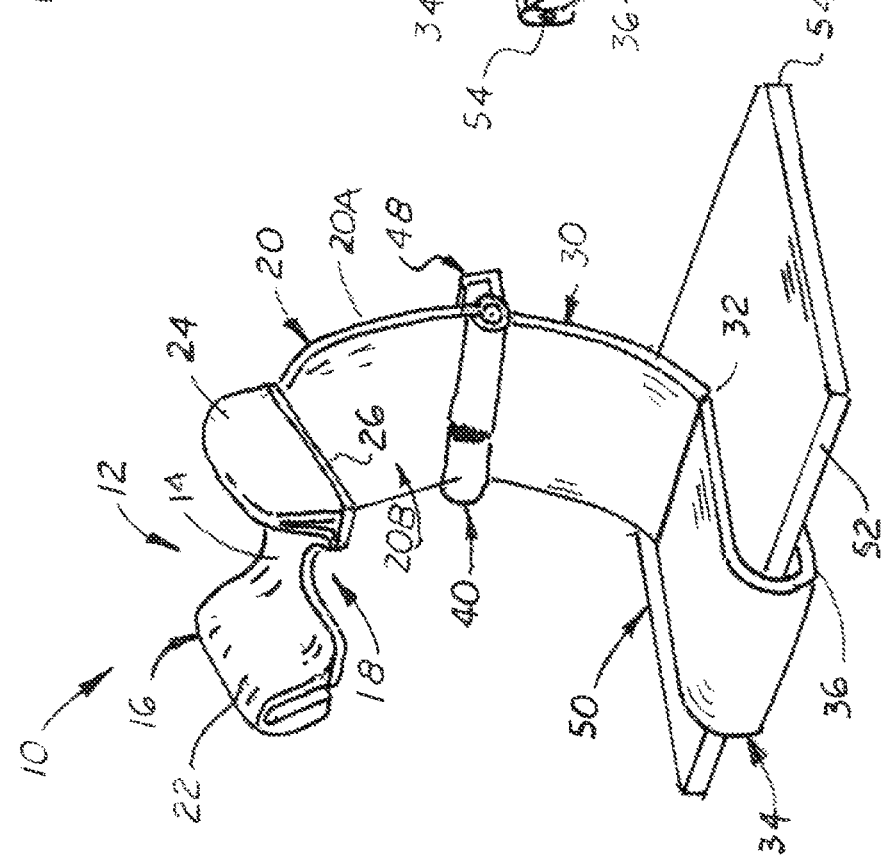
FIG. 2 is a right-side perspective view of the headrest support shown in FIG. 1.

As shown in FIG. 3, a transversely aligned ledge 38 is attached or formed on the front surface of the curved upper support 20. It should be understood that the ledge 38 may be alternatively attached to the front surface of the intermediate member 30. The ledge 38 extends outward from the front surface and is configured to capture the edge of a viewing device 125. As shown in FIG. 1, the curvatures of the upper support 20 and the curved intermediate member 30, and the shape of the ledge 38 are sufficient so that the front surface of a viewing device 125, when placed in the ledge 38, is angled upward for optimal viewing for a user sitting in the passenger seat. To view the viewing device 125, the folding mount 10 must be rotated 180 degrees on the tray table 50 so the edge engaging member 36 captures the front edge 52 of the tray table 50 and the ledge 38 faces the user.

Figure 4:
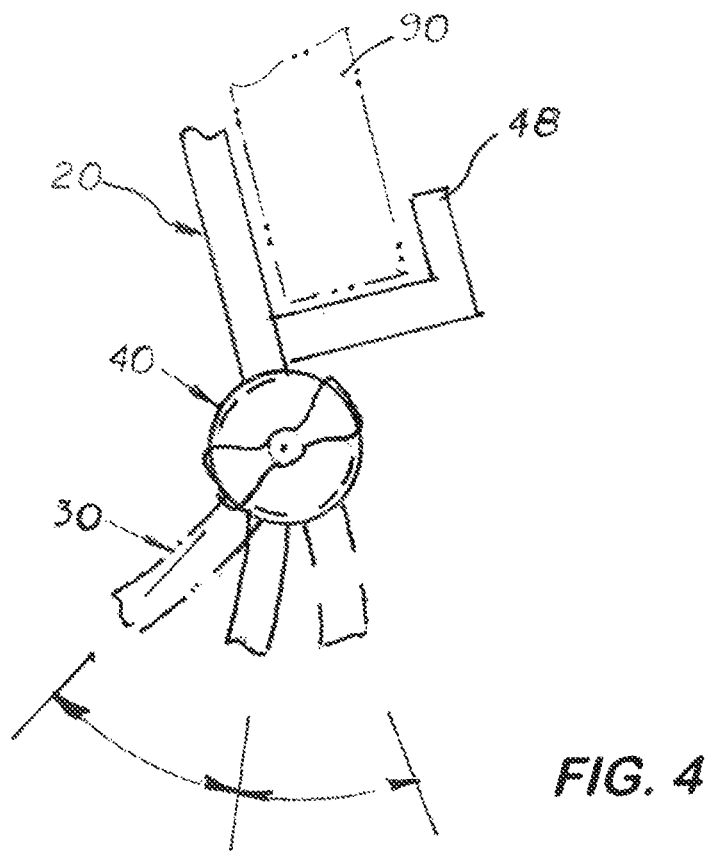
FIG. 4 is a partial side elevational view of an adjustable upper joint showing movement of the upper support and the intermediate member.

FIG. 4 is a partial side elevational view of the folding mount 10 showing movement of the curved upper support 20 over the curved intermediate member 30. Disposed between the curved upper support 20 and the curved intermediate member 30 is an adjustable upper joint 40, shown in FIG. 5. The upper joint 40 enables the user to adjust the position of the curved upper support 20 but also allows the folding mount 10 to be partially folded into a compact configuration on the outside surface of a carry-on brief case 100 as shown in FIG. 6.

Figure 5:
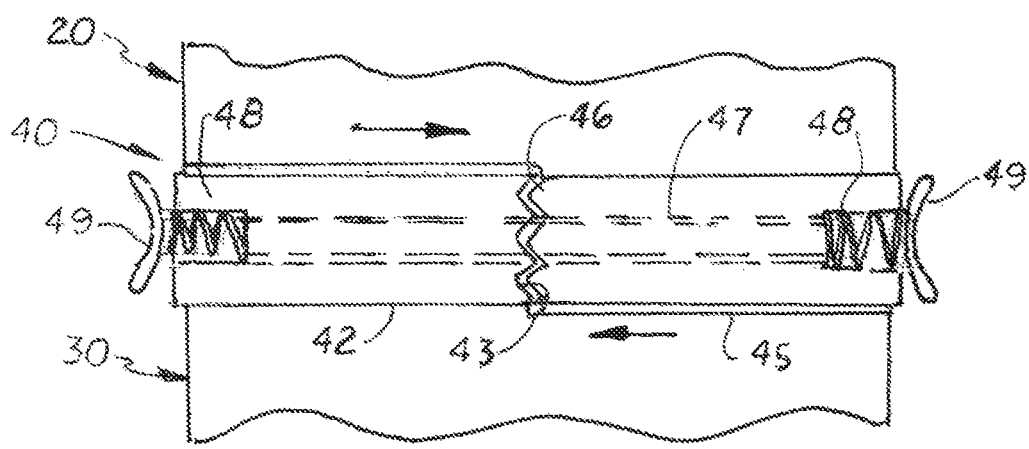
FIG. 5 is a front elevational view of the adjustable upper joint.
Figure 6:
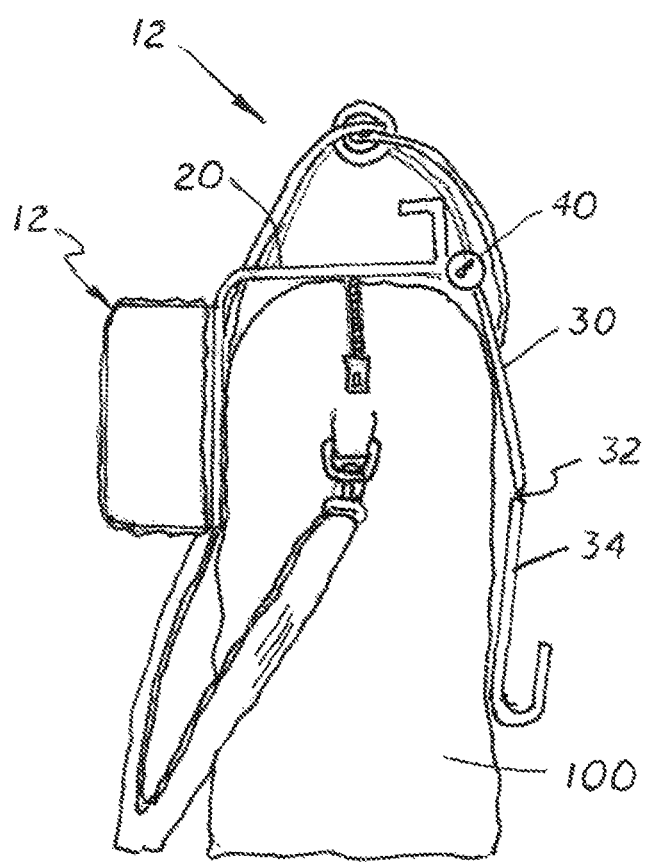
FIG. 6 is a side elevational view of the head rest support partially folded into a compact configuration on the outside surface of a carry-on briefcase.

In the embodiment shown in FIG. 5, the upper joint 40 includes a first cylindrical body 42 attached to the lower edge of the curved upper support 20, and a second cylindrical body 45 attached to the upper edge of the lower arm 30. Each cylindrical body 42, 45 extends transversely approximately the width of the upper support 20, and the intermediate member 30. Formed on the inside surfaces of each cylindrical body 42, 45 are circularly aligned, serrated teeth 43, 46, respectively. The teeth 43, 46 are configured to be meshed together to hold the upper support 20 and intermediate member 30 in an angular fixed position. Extending between the two cylindrical bodies 42, 45 is a bolt 47 with biasing springs 48 placed on each end and a turn nuts 49 that force the serrated teeth 43, 46 together.

Figure 7:
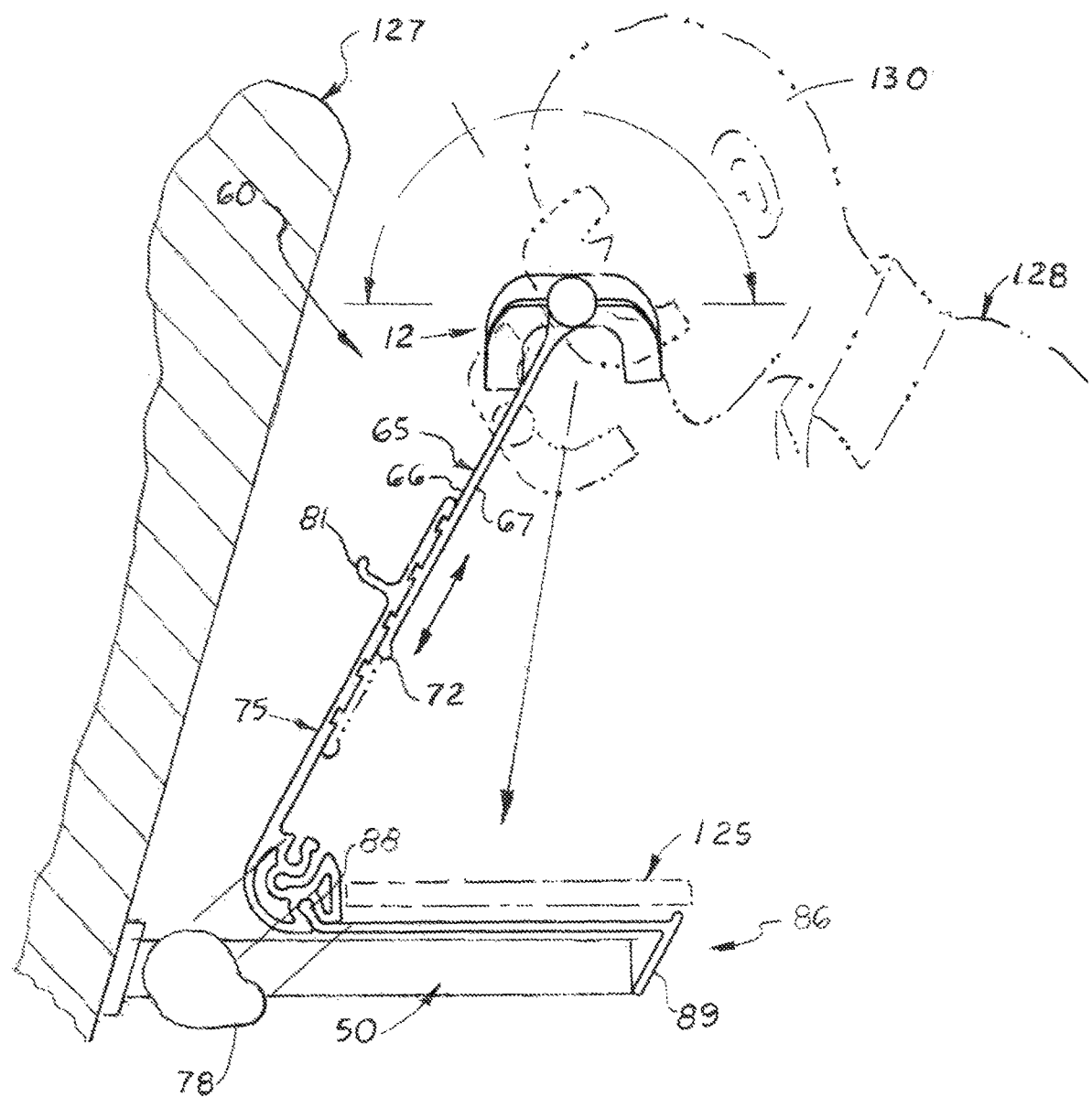
FIG. 7 is an illustration showing a second embodiment of a tray table folding mount positioned on an unfolded tray table attached to the back of a passenger seat with the edge engaging member capturing the rear edge of the tray table and showing a passenger sitting in the passenger seat and leaning forward and resting his head on the headrest support and resting his arms on the lower planar base.

FIG. 7 is an illustration showing a second embodiment of a tray table folding mount, indicated by reference number 60 also positioned on an unfolded tray table 50 attached to the back of a passenger seat 127. Like the first embodiment of the folding mount 10, the second embodiment of the folding mount 60 is configured to support a passenger's head 130 leaning forward over the tray table 50 or to support a viewing device 125 over the tray table 50 when the passenger sits back in the passenger seat.

The folding mount 60 includes a headrest 12' an upper support 65 an intermediate member 75, and lower planar base 86. The folding support 60 includes a swiveling headrest 12' attached to the distal end of a substantially straight rigid upper support 65. The upper support 65 includes a planar front surface 66 and a planar rear surface 67. Formed on the top edge 69 of the upper support 65 are two u-shaped saddles 73, 74 configured to receive the two side ears 14, 15 attached to the center plate 13. As shown in FIG. 13, the top edge 69 of the upper support 65 is concave thereby enabling the headrest 12' and the user's forehead to swing in a fore and aft directions between the two saddles 73, 74. Formed on the front surface 66 of the upper support member 65 are two or more transversely aligned ribs 70. Formed on the bottom edge of the upper support 65 is a round, rearward extending lip 72.

The intermediate member 75 includes a substantially straight rigid planar section 76 and transversely aligned lower cylindrical body 82. The planar section 76 includes a front surface 77 and a rear surface 79. Formed on the front surface 77 is a transversely aligned ledge 81 configured to hold a viewing device 125. Formed on the rear surface 79 are a plurality of transversely aligned slots 80 (five slots shown). The slots 80 are complimentary in shape to the ribs 70 formed on the upper support 65 and spaced apart so that the ribs 70 may engage the slots 80 by sliding the upper support 65 over the intermediate member 75.

Formed on the lower end of the intermediate member 75 is a transversely aligned cylindrical body 82. Formed on the lower surface of the cylindrical body 82 is a transversely aligned slot 85 configured to receive the lip 88 formed on the lower planar base 86 when the mount 60 is assembled as shown in FIG. 7.

Figure 8:
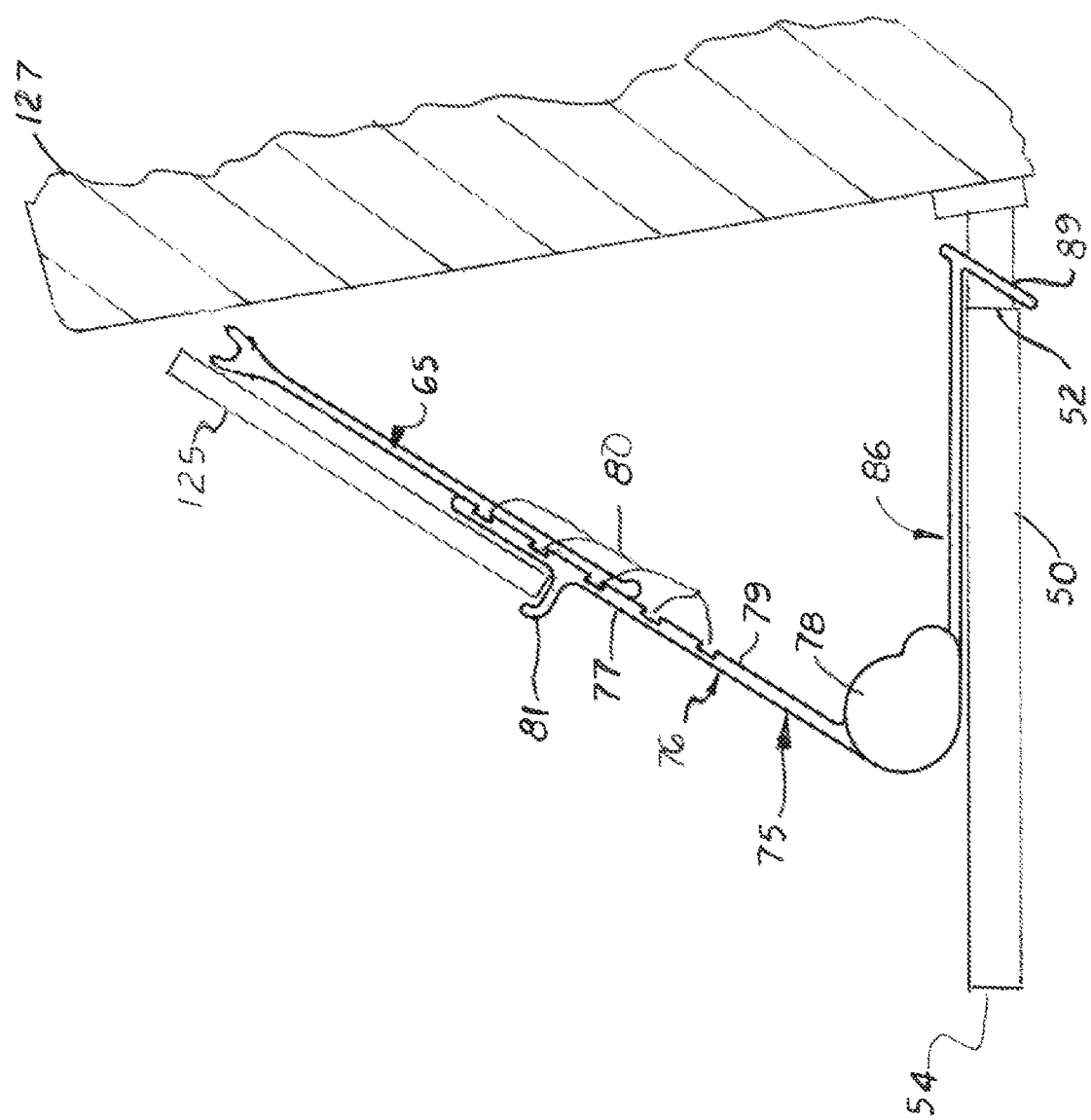
FIG. 8 is a right-side perspective view of the folding mount shown in FIG. 7 with the lower planar base rotated so that the tray table edge engagement lip engages the rear edge of the tray table and showing a viewing device being positioned on the ledge for optimal viewing.

FIG. 8 is a right side perspective view of the headrest support shown in FIG. 7 with the lower planar base 86 rotated so that the tray table edge engagement lip 89 engages the front edge 52 edge of the tray table 50 and showing a viewing device 125 being positioned on the ledge 81 for optimal viewing.

Figure 9:
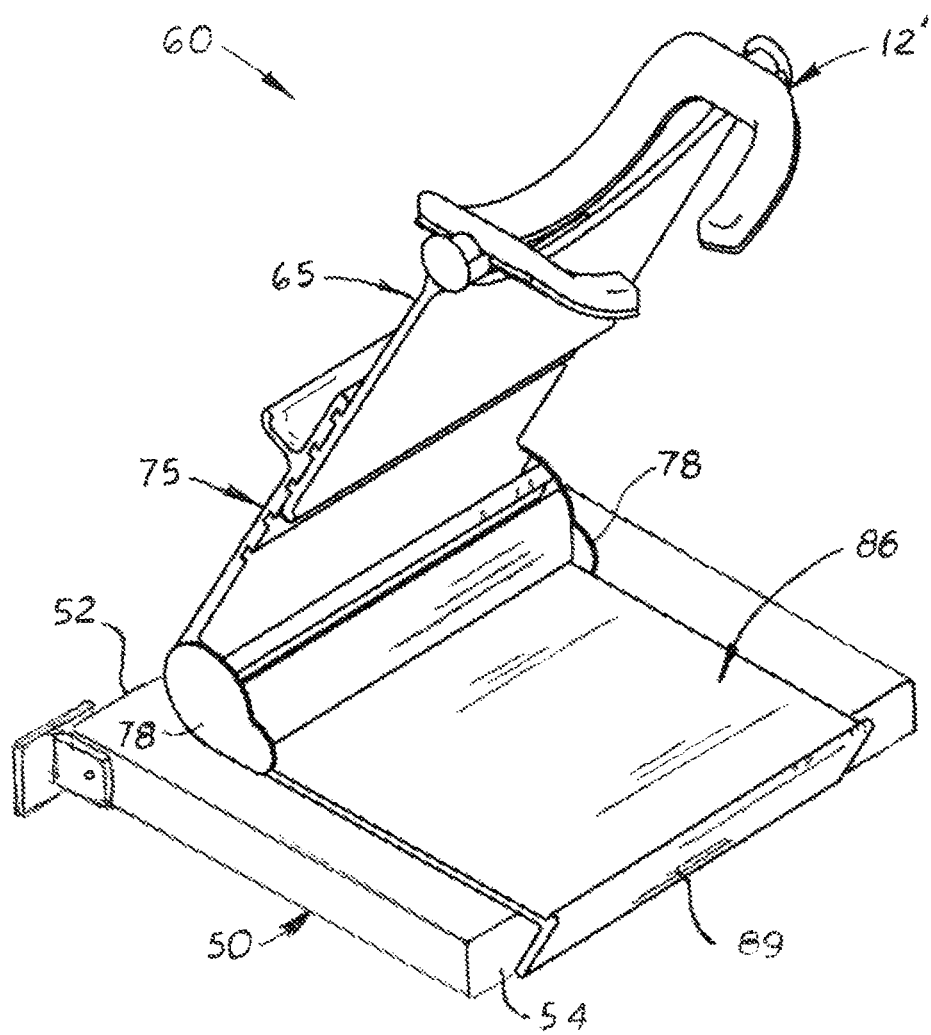
FIG. 9 is a front perspective view of the tray table folding mount shown in FIG. 7.

FIG. 9 is a front perspective view of the tray table folding mount 60 mounted over a tray table 50 with the edge engaging lip 89 disposed over the rear edge 54 of the tray table 50.

Also formed on the top surface of the cylindrical body 82 is an axially aligned first slot 83 configured to slidingly receive the extended lip 72 on the upper support 65 when stored in a compact configuration. Also formed on the cylindrical body 82 is a transversely aligned second slot 84 configured to receive the lip 88 formed on the lower support member 86 when stored in a compact configuration.

Figure 10:
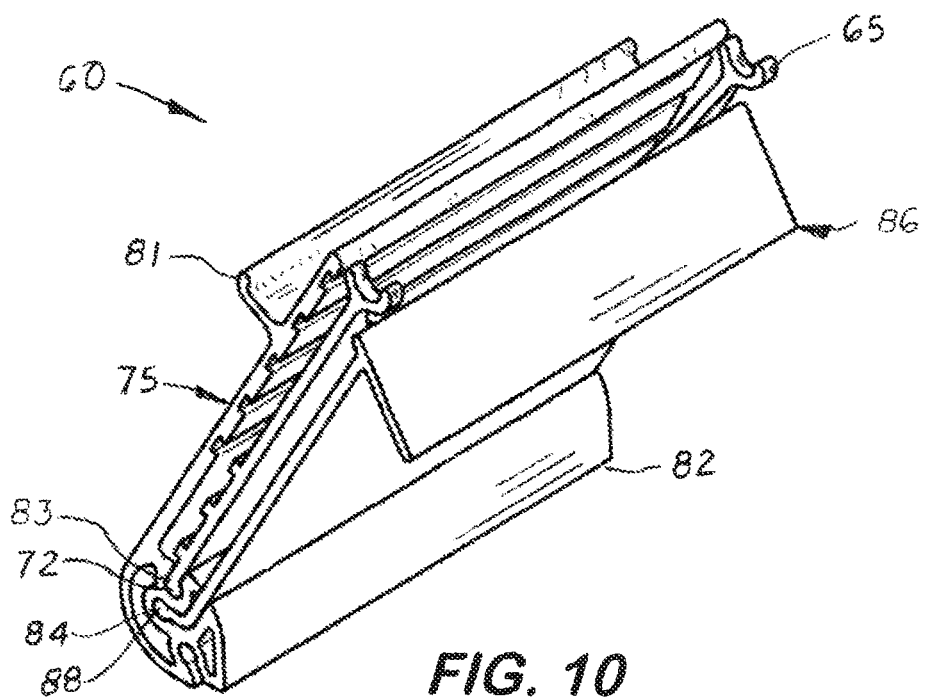
FIG. 10 is a front perspective view of the tray table folding mount shown in a storage configuration.
Figure 11:
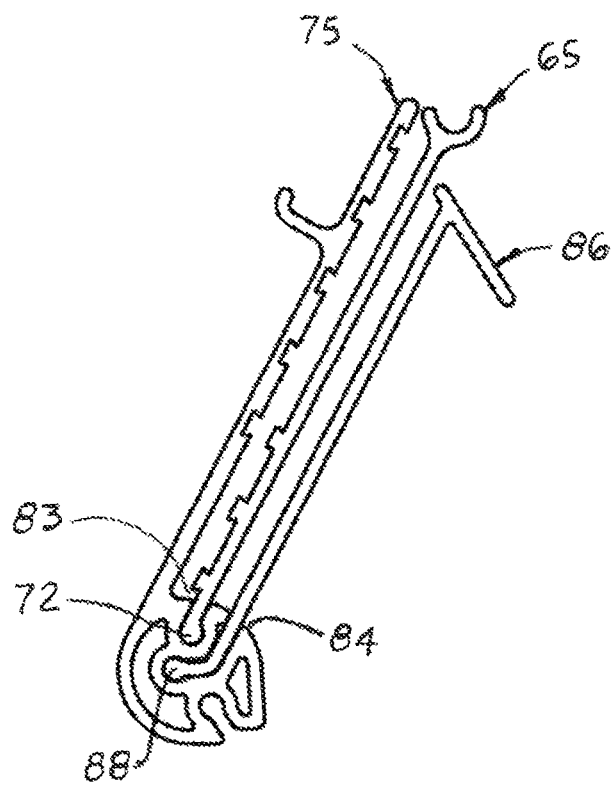
FIG. 11 is a side elevational view of the tray table folding mount shown in FIG. 10.

FIGS. 10 and 11 are views of the tray table folding mount 60 shown in a compact storage configuration.

FIG. 12 is a front perspective view of the intermediate member 75.

FIG. 13 is a front perspective view of the upper support 65,

FIG. 14 is a front perspective view lower planar base 86.

Figure 15:
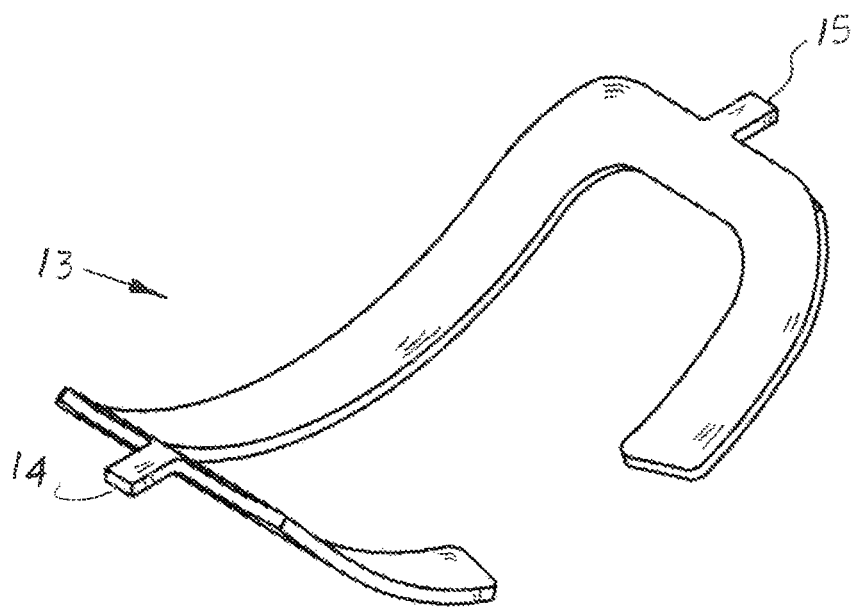
FIG. 15 is a perspective view of the center plate used with the headrest.

FIG. 15 is a perspective view of the center plate 13 used with the headrest 12'.

Figure 16:
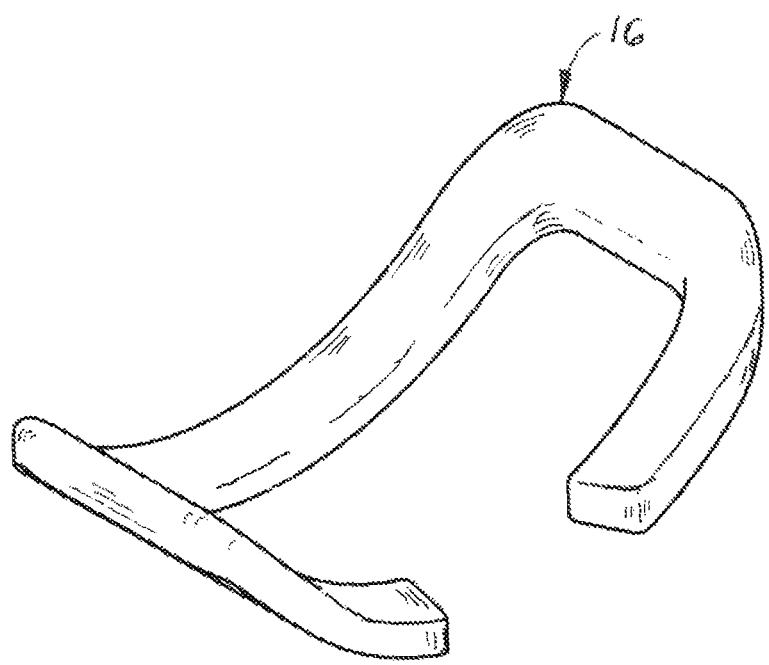
FIG. 16 is a perspective view of the cushion used with the center plate.

FIG. 16 is a perspective view of the cushion 16 used with the center plate 13.

Figure 17:
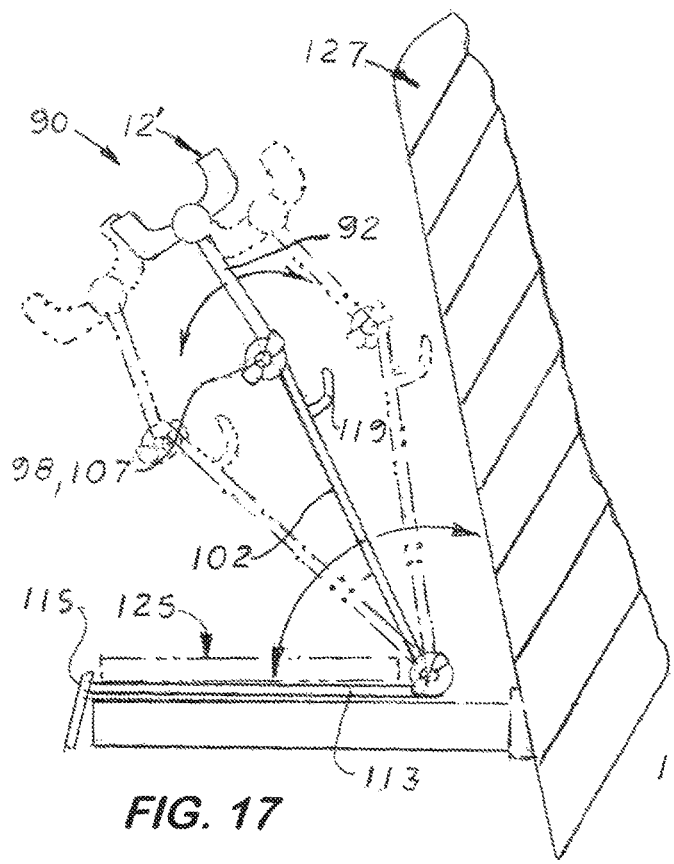
FIG. 17 is an illustration showing a third embodiment of a tray table folding mount positioned on an unfolded tray table attached to the back of a passenger seat with the edge engaging member capturing the rear edge of the tray table and ready for use by a passenger seating in the passenger seat who leans forward and rests his head on the headrest.
Figure 18:
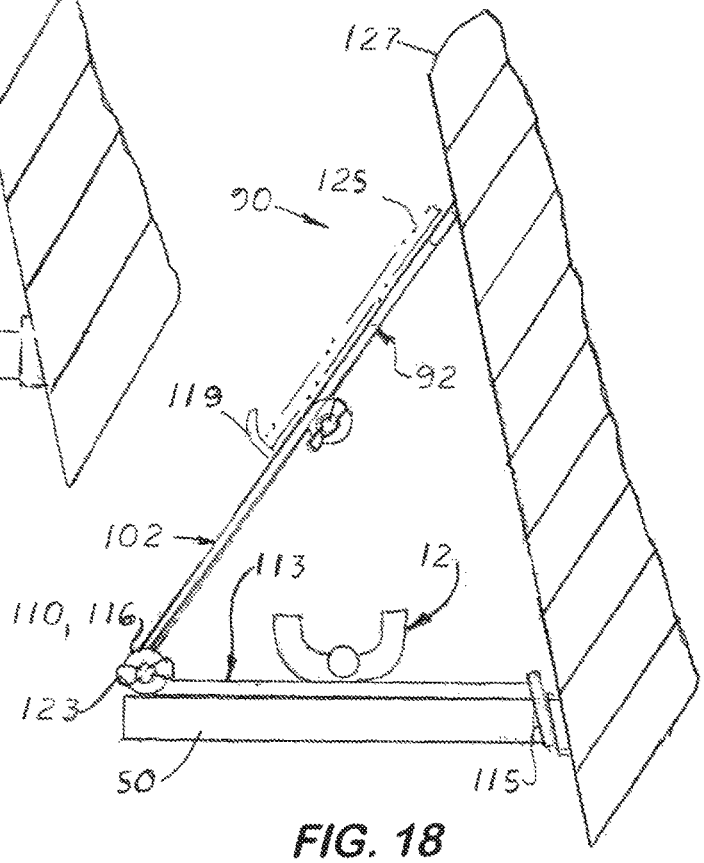
FIG. 18 is a right-side perspective view of the folding mount shown in FIG. 17 with the lower planar base rotated so that the tray table edge engagement member engages the front edge of the tray table and showing a viewing device being positioned on the ledge for optimal viewing.
Figure 19:
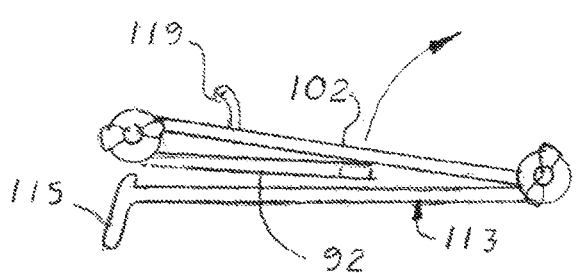
FIG. 19. is a side elevational view of the tray table folding mount shown in FIGS. 17 and 18 folded into a storage configuration.
Figure 20:
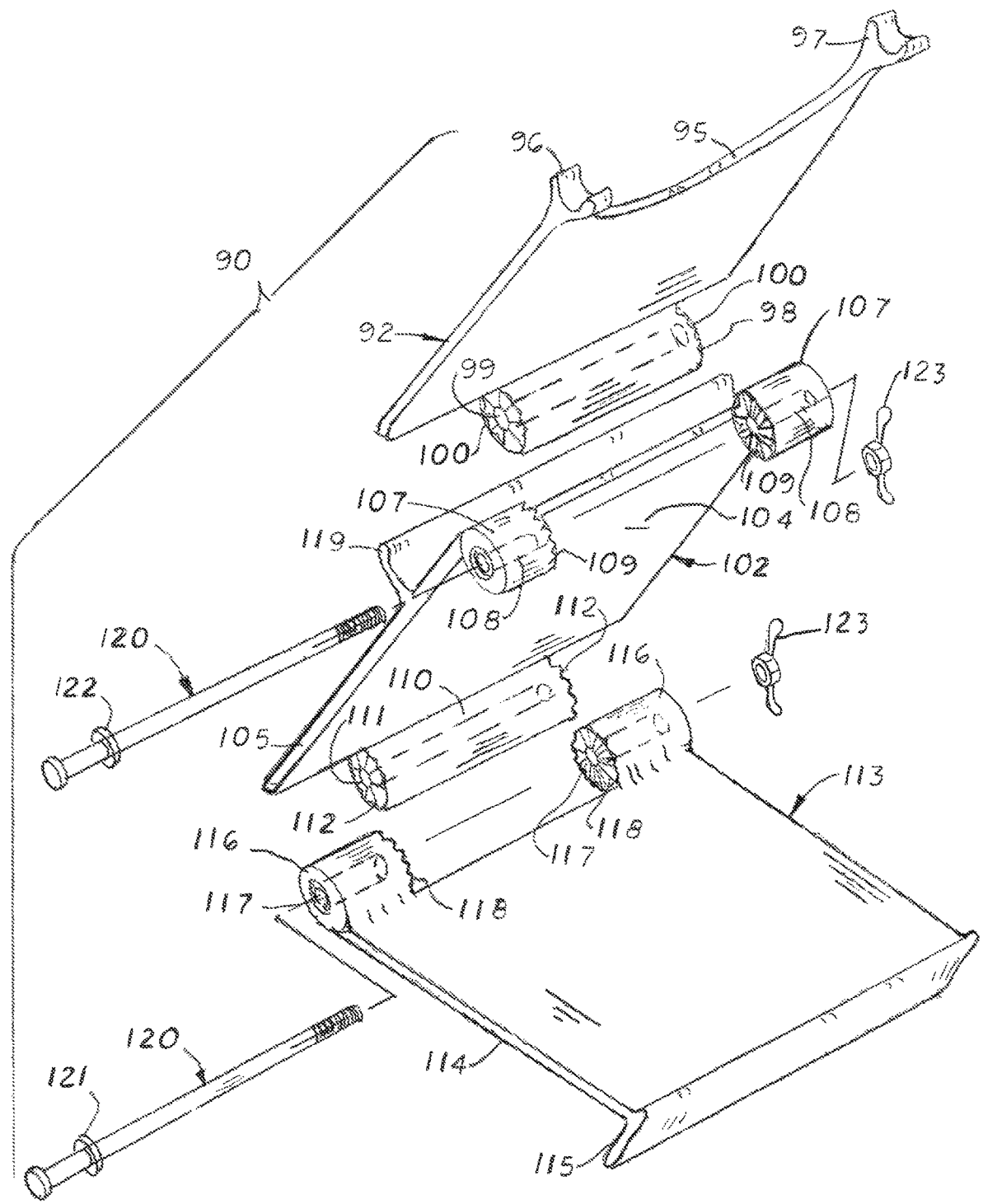
FIG. 20 is an exploded view of the tray table folding mount shown in FIGS. 17-19.

FIG. 17 is an illustration showing a third embodiment of a tray table folding mount 90 positioned on an unfolded tray table 50 attached to the back of a passenger seat 127 with the edge engaging member 115 capturing the rear edge 54 of the tray table 50 and ready for use by a passenger sitting in the passenger seat who leans forward and resting his head on the headrest 12. As shown in FIGS. 17-19, the folding mount 90 includes planar upper support 92 with two upward extending saddles 96, 97 configured to engage the two side ears 14, 15 on a headrest 12 shown in FIG. 9. A recessed, curved cutout 95 is formed on the top edge of the upper support 92. Formed on or near the lower edge of the upper support 92 is a hinge body 98. Formed inside the hinge body 98 is an axially aligned center bore 99. Formed on the opposite ends of the hinge body 98 are radially aligned serrated teeth 100.

The folding mount 90 also includes a planar intermediate member 102 with a front surface 104 and a back surface 105. Formed on the top edge of the intermediate member are two cylindrical hinge bodies 107. Each hinge body 107 includes an axially aligned center bore 108. Formed on the inside surface of each hinge body 107 are re radially aligned serrated teeth 109 configured to engage the serrated teeth 100 on the upper support 92.

Formed on the lower edge of the planar intermediate member 102 is a single lower hinge body 110. Formed inside the hinge body 110 is an axially aligned center bore 111. Formed on the opposite ends of the hinge body 111 are radially aligned serrated teeth 112.

The folding mount 90 also includes a lower planar base 113 that includes a transversely aligned edge engaging member 115. Formed on the edge of the lower planar base 113 opposite the edge engaging member 115 are two hinge bodies 116. Each hinge body 116 includes an axially aligned center bore 117. Formed on the inside surface of each hinge body 116 are radially aligned serrated teeth 118 configured to engage the serrated teeth 112 on the hinge body 110.

During assembly, the lower hinge body 110 is inserted and aligned with the two hinge bodies 116 on the lower planar base 113. The hinge body 98 is inserted and aligned with the two hinge bodies 107 on the intermediate member 102. A first bolt 120 with a washer 121 are inserted into the bores 117 and 111 to hold the lower hinge body 110 between the two hinge bodies 116. A wing nut 123 is then attached to the threaded exposed end of the first bolt 120. A second bolt 120 is inserted into the bores 108 and 99 to hold the hinge body 98 on the upper support 92 between the two hinge bodies 107 on the intermediate member 102. A wing nut 123 is then attached to the threaded exposed end of the second bolt 120. During use, the wing nuts 123 press against the hinge bodies 107 and 116 forcing the serrated teeth 109 against teeth 99 and 100 and forcing the 118 against serrated teeth 112. When the wing nuts 123 may be loosen, the serrated teeth 109 disengage thereby enabling the upper support 92 to rotate around the intermediate member 102 and allow the intermediate member 102 to rotate around the lower planar support 113.

FIG. 19. is a side elevational view of the tray table folding mount 90 shown in FIGS. 17 and 18 showing the upper support 92 being pivoted inward over the intermediate member 102 and the intermediate member 102 being pivoted inward over the lower planar support 113.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A tray table mount, comprising:
   a. a lower planar base configured to rest over a tray table, said lower planar base includes an edge engaging member configured to abut an edge of said tray table when said lower planar base is positioned over said tray table;
   b. an intermediate member selectively attached and held at a fixed angle above and over said lower planar base, said intermediate member includes a front surface and a rear surface;
   c. an upper support being longitudinally aligned and selectively attached to the rear surface of said intermediate member, said upper support includes an upper section with two saddles, a concave top edge and a lower edge;
   d. a headrest positioned transversely above said concave top edge of said upper support and supported by said saddles; and
   e. a ledge formed or attached to said front surface of said intermediate member, said ledge configured to hold a viewing device over said front surface of said intermediate member.

2. The tray table mount as recited in claim 1 further including at least one adjustable locking hinge disposed between said lower planar base and said intermediate member.

3. The tray table mount, as recited in claim 1, wherein said intermediate member includes a transversely aligned cylindrical member with a transversely aligned slot and said lower planar base includes a lip opposite said edge engaging member, said lip configured to selectively attach to said slot thereby attaching said lower planar base to said intermediate member.

4. The tray table mount, as recited in claim 1, wherein said intermediate member is pivotally attached to said lower planar base.

5. The tray table mount, as recited in claim 4, wherein said intermediate member is pivotally attached to said upper support.

6. The tray table mount, as recited in claim 1, wherein said headrest includes two laterally extending side arms configured to rest in said saddles thereby allowing said headrest to swivel over said upper support.

7. The tray table mount, as recited in claim 1, wherein said intermediate member includes a plurality of transversely aligned slots and said upper support includes a plurality of transversely aligned ribs, said slots and said ribs configured to be selectively engaged to lock said intermediate member and said upper support together.

8. The tray table mount, as recited in claim 7, wherein said headrest includes two laterally extending side arms configured to rest in said saddles formed on said upper section.

9. The tray table mount, as recited in claim 7, wherein said intermediate member is pivotally attached to said upper support.

10. The tray table mount as recited in claim 9, wherein said headrest includes two side arms and said upper support includes two saddles, said saddles configured to engage said side arms on said headrest and allow said headrest to swivel over said upper support.

11. The tray table mount, as recited in claim 7, wherein said intermediate member includes a transversely aligned cylindrical member with a transversely aligned slot and said lower planar base includes a lip opposite said edge engaging member, said lip configured to selectively attach to said slot thereby attaching said lower planar base to said intermediate member.

12. The tray table mount, as recited in claim 11, wherein said cylindrical member includes a second transversely aligned slot and said upper support includes a lip formed on said lower edge configured to selectively attach to said second slot thereby selectively attaching said upper support to said cylindrical member.

13. The tray table mount as recited in claim 7 further including at least one adjustable locking hinge disposed between said intermediate member and said upper support.

14. The tray table mount as recited in claim 13, wherein said headrest includes two side arms and said upper support includes two saddles, said side arms configured to receive said saddles thereby enabling said headrest to swivel over said upper support.

15. A tray table mount, comprising;
   a. an upper support that includes an upper section, and a lower edge, a top edge, two saddles extending upward from said top edge;
   b. a headrest attached to said two saddles, said headrest being curved and configured to support a user's face;
   c. an intermediate member longitudinally aligned and coupled at one end to said upper support, said intermediate member includes a cylindrical body with a slot formed thereon, said intermediate member includes a front surface and a rear surface;
   d. a lower planar base configured to be placed over a tray table, said lower planar base includes a transversely aligned edge with an edge engaging member configured to abut an edge of said tray table and prevent movement of said lower planar base over said tray table, said lower planar base also includes a lip formed on an edge opposite said edge engaging member that engages said slot formed on said intermediate member to selectively hold said intermediate member in a diagonally aligned position over said lower planar base; and
   e. a ledge attached to said front surface of said intermediate member, said ledge configured to hold a viewing device over said front surface of said intermediate member.

* * * * *